United States Patent
Zhu et al.

(10) Patent No.: US 11,906,957 B1
(45) Date of Patent: Feb. 20, 2024

(54) METHOD FOR ASSESSING SHORT-TERM VOLTAGE STABILITY OF POWER GRID BASED ON SYNCHRONOUS SPATIO-TEMPORAL INFORMATION LEARNING

(71) Applicant: HUNAN UNIVERSITY, Changsha (CN)

(72) Inventors: Lipeng Zhu, Changsha (CN); Zhikang Shuai, Changsha (CN); Jiayong Li, Changsha (CN); Bin Zhou, Changsha (CN); Cong Zhang, Changsha (CN); Yuhan Hu, Changsha (CN); Weizhi Huang, Changsha (CN); Limengqian Zheng, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/223,559

(22) Filed: Jul. 19, 2023

(30) Foreign Application Priority Data

Mar. 9, 2023 (CN) .......................... 202310219066.9

(51) Int. Cl.
  *G05B 23/02* (2006.01)
  *H02J 3/00* (2006.01)
(52) U.S. Cl.
  CPC .......... *G05B 23/0221* (2013.01); *H02J 3/001* (2020.01); *G05B 2223/06* (2018.08); *H02J 2203/20* (2020.01)
(58) Field of Classification Search
  CPC ............. G05B 23/0221; G05B 2223/06; H02J 2203/20; H02J 3/001

(Continued)

(56) References Cited

U.S. PATENT DOCUMENTS

2018/0048530 A1* 2/2018 Nikitaki ................ H04L 43/087
2021/0391723 A1* 12/2021 Lu ............................ G06N 3/10

FOREIGN PATENT DOCUMENTS

CN   101777759 A   7/2010
CN   107482621 A   12/2017

(Continued)

OTHER PUBLICATIONS

Zhang Ruoyu, Self-adaptive Power System Transient Stability Prediction Based on Transfer Learning, Power System Technology, 2020, pp. 2196-2203, vol. 44, No. 6.

(Continued)

*Primary Examiner* — Jigneshkumar C Patel
(74) *Attorney, Agent, or Firm* — Bayramoglu Law Offices LLC

(57) ABSTRACT

A method for assessing short-term voltage stability of a power grid based on synchronous spatio-temporal information learning includes: performing a time-domain simulation for each transient fault of a power grid under each operating mode, and extracting temporal response trajectories of each monitoring bus and stability status information of the power grid to obtain a transient sample set; constructing a spatial adjacency matrix and a temporal adjacency matrix separately, and integrating the spatial adjacency matrix and the temporal adjacency matrix into a spatio-temporal adjacency matrix; performing synchronous spatio-temporal information learning by using a graph convolutional neural network algorithm, and performing training to obtain a short-term voltage stability assessment model driven by spatio-temporal information synchronization; and inputting a transient temporal responsive trajectory obtained into the short-term voltage stability assessment model, to obtain an assessment result of short-term voltage stability of the power grid.

4 Claims, 1 Drawing Sheet

(58) Field of Classification Search
USPC .......................................................... 700/296
See application file for complete search history.

(56) References Cited

FOREIGN PATENT DOCUMENTS

| | | |
|---|---|---|
| CN | 111756034 A | 10/2020 |
| CN | 113762625 A | 12/2021 |
| CN | 114006413 A | 2/2022 |
| CN | 115238980 A | 10/2022 |

OTHER PUBLICATIONS

Yonghong Luo, et al., Data-driven short-term voltage stability assessment based on spatial-temporal graph convolutional network, International Journal of Electrical Power and Energy Systems, 2021, pp. 1-10, vol. 130, 106753.

Lipeng Zhu, et al., Networked Time Series Shapelet Learning for Power System Transient Stability Assessment, IEEE Transactions on Power Systems, 2022, pp. 416-428, vol. 37, No. 1.

* cited by examiner

METHOD FOR ASSESSING SHORT-TERM VOLTAGE STABILITY OF POWER GRID BASED ON SYNCHRONOUS SPATIO-TEMPORAL INFORMATION LEARNING

CROSS REFERENCE TO THE RELATED APPLICATIONS

This application is based upon and claims priority to Chinese Patent Application No. 202310219066.9, filed on Mar. 9, 2023, the entire contents of which are incorporated herein by reference.

TECHNICAL FIELD

The present disclosure relates to the field of short-term voltage stability assessment technologies in power grids, and in particular, to a method for assessing short-term voltage stability of power grids based on synchronous spatio-temporal information learning.

BACKGROUND

In densely-populated urban areas, when an urban power grid suffers from a severe disturbance such as a transient fault, a large quantity of induction motors quickly absorb reactive power at a low voltage level and this causes insufficient support for the grid's transient voltages. In addition, it is difficult to expand the existing urban power grid to meet the ever-increasing power load demand, and it is not possible to build power plants or equip large-capacity reactive power compensation devices locally on a large scale. This will further exacerbate insufficient support for regional reactive power and voltage after a transient disturbance. During real-time operation of the urban power grid, if short-term voltage stability of the power grid cannot be assessed reliably and no control measure is taken in a timely manner, large-scale voltage instability or even a voltage collapse may easily occur.

In order to resolve the challenging problem of online assessment of the short-term voltage stability of the power grid, based on advanced technologies such as machine learning, many research institutes and electric power companies have proposed data-driven short-term voltage stability assessment methods for practical power grids in recent years. However, most of the existing methods simply and asynchronously learn temporal and spatial information of the transient processes of power grids in a discrete manner, lacking an effective synchronous processing mechanism. Consequently, in the learning processes of stability assessment model construction, an information loss is inevitably caused, which affects reliability of the stability assessment models.

SUMMARY

A technical problem to be resolved by the present disclosure is to provide a method for assessing short-term voltage stability of a power grid based on synchronous spatio-temporal information learning, to quickly and reliably assess short-term voltage stability of a power grid during online monitoring.

In order to resolve the above technical problem, the present disclosure adopts following technical solutions: A method for assessing short-term voltage stability of a power grid based on synchronous spatio-temporal information learning. This method includes:

step S1: performing a time-domain simulation for each transient fault of the power grid under each operating mode, and extracting the temporal responsive trajectory of each monitoring bus and the status information regarding the short-term voltage stability of the power grid from the time-domain simulation process to obtain a transient sample set;

step S2: constructing a spatial adjacency matrix and a temporal adjacency matrix separately by using a network impedance matrix of the power grid and correlations between power grid statuses at different time instants, and integrating the spatial adjacency matrix and the temporal adjacency matrix into a spatio-temporal adjacency matrix to comprehensively characterize a spatio-temporal correlation between monitoring buses within different time instants in a transient process of the power grid;

step S3: performing synchronous spatio-temporal information learning on the transient sample set by using a graph convolutional neural network algorithm, and performing classification training to obtain a short-term voltage stability assessment model driven by spatio-temporal information synchronization; and step S4: when the power grid suffers from a transient fault during online operation, obtaining a transient temporal responsive trajectory of each monitoring bus in real time, and inputting the transient temporal responsive trajectory into the short-term voltage stability assessment model, and outputting, by the model, an online assessment result of the short-term voltage stability status of the power grid in real time.

Further, in step S1, an operating mode set and a transient fault set of the power grid are obtained from the dispatching platform of the power grid; N time-domain simulations are performed on all the transient faults of the power grid under all the operating modes by using an electromechanical transient time-domain simulation method, where N=a*b, a represents the number of operating modes, and b represents the number of transient faults; temporal responsive trajectories of a voltage V, a current I, an active power P, and a reactive power Q within L=50 time instants are recorded for each monitoring bus after the transient fault, and the power grid's stability status Y in each time-domain simulation process is recorded, where Y=1 represents transient voltage stability, and Y=−1 represents transient voltage instability; all temporal responsive trajectories and power grid's stability status recorded in one time-domain simulation process form a transient sample; and all transient samples obtained from the N time-domain simulations are collected to form the transient sample set containing N samples.

Further, step S2 includes:

step S21: constructing the spatial adjacency matrix $A^S$ for measuring an adjacency degree between the monitoring bus of the power grid, as shown in following formulae:

$$D_{ij} = |(Z_{ii} - Z_{ij}) - (Z_{ji} - Z_{jj})|^2 \qquad (1)$$

$$D = [D_{ij}]_{n*n} \qquad (2)$$

$$D_{ij}^{norm} = D_{ij} / (\max_{1 \le u, v \le n} D_{uv}) \qquad (3)$$

$$A_{ij}^S = \frac{1}{1 + D_{ij}^{norm}} \bigg/ \left( \max_{1 \le u, v \le n} \frac{1}{1 + D_{uv}^{norm}} \right) \qquad (4)$$

$$A^S = [A_{ij}^S]_{n*n} \qquad (5)$$

where Z represents an impedance value between the monitoring buses; i and j represent different monitoring buses, where $1 \leq i$, and $j \leq n$; n represents the total number of monitoring buses in the power grid; $D_{ij}$ represents the electrical distance between the monitoring bus i and the monitoring bus j; D represents an electrical distance matrix; $\max_{1 \leq u, v \leq n} D_{uv}$ represents the maximum value of all the elements in the electrical distance matrix D, where u and v represent different monitoring buses, $1 \leq u$, and $v \leq n$; $D_{ij}^{norm}$ represents a normalized electrical distance between the monitoring bus i and the monitoring bus j; $D_{uv}^{norm}$ represents a normalized electrical distance between the monitoring bus u and the monitoring bus v; and $A_{ij}^{S}$ represents a metric of a spatial adjacency degree between the monitoring bus i and the monitoring bus j;

step S22: constructing the temporal adjacency matrix $A^T$ representing a temporal correlation between the monitoring buses within two consecutive time instants after the power grid suffers from the transient fault, as shown in following formulae:

$$A_{ij}^{T} = \begin{cases} 1, & i = j \\ 0, & i \neq j \end{cases} \quad (6)$$

$$A^T = [A_{ij}^T]_{n*n} \quad (7)$$

where $A_{ij}^T$ represents a metric of a temporal adjacency degree between the monitoring bus i and the monitoring bus j; and step S23: constructing the spatio-temporal adjacency matrix $A^{ST}$ representing a spatio-temporal correlation between the monitoring buses within three consecutive time instants after the power grid suffers from the transient fault, as shown in a following formula:

$$A^{ST} = \begin{bmatrix} A^S & A^T & 0 \\ A^T & A^S & A^T \\ 0 & A^T & A^S \end{bmatrix} \quad (8)$$

Further, step S3 includes:

step S31: performing, by using the graph convolutional neural network algorithm, synchronous spatio-temporal information learning on the transient sample set obtained in step S1, to match with the spatio-temporal adjacency matrix $A^{ST}$ obtained in step S23, dividing the temporal responsive trajectories of the V, the I, the P, and the Q within the L time instants contained in each sample in the transient sample set obtained in step S1 into L−2 trajectory slices consisting of three consecutive time instants, concisely denoting temporal response trajectories of the V, the I, the P, and the Q within three consecutive time instants in a trajectory slice as x, mapping the x to a hidden layer state $h^0$ using a fully connected layer, and performing spatio-temporal graph convolution operation on the $h^0$ by using a graph convolution learning module to obtain $h^1$:

$$h^1 = (A^{ST}h^0W_1+b_1)e\sigma(A^{ST}h^0W_2+b_2) \quad (9)$$

where $h^1$ represents a hidden layer state obtained by the graph convolution operation, $W_1$, $W_2$, $b_1$, and $b_2$ represent to-be-learned parameters during the graph convolution operation, $\sigma(*)$ represents a sigmoid activation function, and e represents a matrix dot product; and performing the graph convolution operation for L−2 times during graph convolution learning, learning L−2 trajectory slices separately, associating the hidden layer state $h^1$ with a fully connected layer and a flattening layer sequentially after completing the graph convolution learning, denoting the output of the flattening layer as f and associating the output f of the flattening layer with a discretized output of the power grid's predicted stability status Y' by using the sigmoid activation function, to construct the short-term voltage stability assessment model driven by spatio-temporal information synchronization; and step S32: implementing, by using the transient sample set obtained in step S1, synchronous spatio-temporal information learning and performance test on the constructed short-term voltage stability assessment model driven by spatio-temporal information synchronization in step S31, until stability assessment accuracy of the model meets a requirement.

Preferably, in step S32, the performance test is performed on the obtained short-term voltage stability assessment model by using a cross validation method; let $N_f$ denote the sum of the number of samples whose actual power grid status are Y=1 but their predicted status are mistakenly assessed to be unstable (i.e., Y'=−1) and of the number of samples whose actual power grid status are Y=−1 but their predicted status are mistakenly assessed to be stable (i.e., Y'=−1) in the transient sample set; the stability assessment accuracy of the short-term voltage stability assessment model is calculated according to a formula Acc=$N_f$/N× 100%; and if Acc≥97%, stability assessment performance of the short-term voltage stability assessment model meets a requirement, and the training of the short-term voltage stability assessment model is completed, and then step S4 is performed; if Acc<97%, the synchronous spatio-temporal information learning is performed again by using the transient sample set obtained in step S1 until Acc≥97%, and then step S4 is performed.

Preferably, in step S4, when the power grid suffers from a transient fault during online operation, the synchronous phasor measurement units deployed at individual monitoring buses in the power grid acquire temporal data of responsive trajectories of V, I, P, and Q within the L time instants in real time after the grid suffers from the transient fault, the obtained temporal data of responsive trajectories of V, I, P, and Q are input into the short-term voltage stability assessment model that passes the performance test in step S32, and the short-term voltage stability assessment model outputs the online assessment result indicating whether the power grid is in a stable status or an unstable status after the transient fault.

Different from traditional data-driven methods that process temporal evolution/spatial distribution information in the transient processes of the power grid in an isolated manner, the method for assessing short-term voltage stability of a power grid based on synchronous spatio-temporal information learning in the present disclosure performs synchronous and deep fusion of spatial and temporal information in massive transient scenarios, and comprehensively mines and extracts the inherent spatio-temporal correlations and key stability features that are related to short-term voltage stability of the grid from a wide-area spatio-temporal perspective via spatio-temporally synchronized graph neural network learning, to achieve online assessment on whether the power grid is in stable/unstable status. This learning method based on synchronous and deep fusion of spatio-temporal information not only can improve assessment reliability of the short-term voltage stability status of the power grid, but also can be extended to applications such as high-precision transient trajectory sensitivity prediction and voltage response prediction, thereby providing advanced technical support for establishing a robust and adaptive online decision-making and control scheme for short-term voltage stability enhancement of the power grid.

DETAILED DESCRIPTION OF THE EMBODIMENTS

For the convenience of understanding by those skilled in the art, the present disclosure will be further described with reference to the embodiments and accompanying drawings. The content mentioned in the implementations is not intended to limit the present disclosure.

Figure 1:
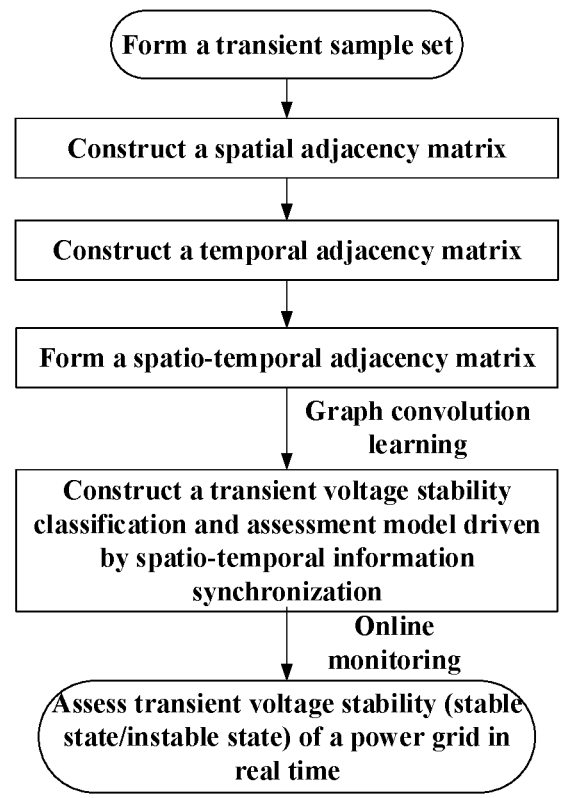
FIG. 1 is a flowchart of a method for assessing short-term voltage stability of a power grid based on synchronous spatio-temporal information learning according to the present disclosure.

To overcome a bottleneck of an existing short-term voltage stability assessment technology for a power grid, the present disclosure provides a method for assessing short-term voltage stability of a power grid based on synchronous spatio-temporal information learning. The present disclosure deeply fuses spatio-temporal information of a power grid in massive transient fault scenarios, synchronizes and deeply learns the spatio-temporal information by using a graph convolutional neural network algorithm, and excavates and extracts a key spatio-temporal evolution feature closely related to short-term voltage stability of the power grid, so as to establish a short-term voltage stability assessment model driven by spatio-temporal information synchronization for the power grid, to quickly and reliably assess a stable status/an unstable status of a transient voltage of the power grid online. Specifically, FIG. 1 shows an overall process of the method for assessing short-term voltage stability of a power grid based on synchronous spatio-temporal information learning according to the present disclosure, including following steps.

Step S1: An operating mode set and a transient fault set of the power grid are obtained from a dispatching platform of the power grid; N time-domain simulations are performed on all the transient faults of the power grid under all the operating modes by using an electromechanical transient time-domain simulation method (assuming that the power grid contains a total of a operating modes and b transient faults, N=a*b); in each time-domain simulation process, temporal response trajectories of electrical quantities such as V, I, P, and Q within L (L=50 in this embodiment) time instants are recorded for each monitoring bus in the power grid after the monitoring bus suffers from a transient fault, and power grid status Y in each time-domain simulation process is recorded (Y=1 represents that the transient voltage of the power grid is in the stable status, and Y=−1 represents that the transient voltage of the power grid is in the unstable status); all information (including temporal response trajectories of the V, the I, the P, and the Q, and the system status Y of the power grid) recorded in one time-domain simulation process form a transient sample; and all transient samples obtained from the N time-domain simulations are collected to form a transient sample set containing N samples.

Step S2: Following steps are included.

Step S21: Network impedance matrix $Z=[Z_{ij}]_{n*n}$ containing all monitoring buses in the power grid is obtained (n represents the total number of monitoring buses in the power grid, Z represents an impedance value between the monitoring buses, i and j represent different monitoring buses, $1 \leq i$, and $j \leq n$). Based on the Z, an electrical distance between the monitoring bus i and the monitoring bus j is denoted as $D_{ij}$, electrical distance matrix D is generated, the $D_{ij}$ is standardized as $D_{ij}^{norm}$ by using the maximum value of all elements in the electrical distance matrix D, and the $D_{ij}^{norm}$ is used as a measurement reference of a spatial adjacency degree to construct spatial adjacency matrix $A^S$ for measuring an adjacency degree between the monitoring buses, as shown in following formulae:

$$D_{ij} = |(Z_{ii} - Z_{ij}) - (Z_{ji} - Z_{jj})|^2 \tag{1}$$

$$D = [D_{ij}]_{n*n} \tag{2}$$

$$D_{ij}^{norm} = D_{ij} / (\max_{1 \leq u, v \leq n} D_{uv}) \tag{3}$$

$$A_{ij}^S = \frac{1}{1 + D_{ij}^{norm}} / \left( \max_{1 \leq u, v \leq n} \frac{1}{1 + D_{uv}^{norm}} \right) \tag{4}$$

$$A^S = [A_{ij}^S]_{n*n} \tag{5}$$

In the above formulae, $\max_{1 \leq u,v \leq n} D_{uv}$ represents the maximum value of all elements in the electrical distance matrix D; u and v represent different monitoring buses, where $1 \leq u$, and $v \leq n$; $D_{ij}^{norm}$ represents a normalized electrical distance between the monitoring bus i and the monitoring bus j; $D_{uv}^{norm}$ represents a normalized electrical distance between the monitoring bus u and the monitoring bus v; and $A_{ij}^S$ represents a metric of a spatial adjacency degree between the monitoring bus i and the monitoring bus j.

Step S22: Temporal adjacency matrix $A^T$ is constructed for the power grid to characterize a temporal correlation between the monitoring bus i and the monitoring bus j within an $l^{th}$ time instant and an $(l+1)^{th}$ time instant ($1 \leq l \leq L-1$) after the power grid suffers from the transient fault, as follows in following formulae:

$$A_{ij}^T = \begin{cases} 1, & i = j \\ 0, & i \neq j \end{cases} \tag{6}$$

$$A^T = [A_{ij}^T]_{n*n} \tag{7}$$

In the above formulae, $A_{ij}^T$ represents a metric of a temporal adjacency degree between the monitoring bus i and the monitoring bus j.

Step S23: Three consecutive time instants, namely, the $l^{th}$ time instant, the $(l+1)^{th}$ time instant, and an $(l+2)^{th}$ time instant, after the power grid suffers from the transient fault are comprehensively considered, and spatio-temporal adjacency matrix $A^{ST}$ that comprehensively represents a spatio-temporal correlation of each monitoring bus of the power grid within the $l^{th}$ time instant, the $(l+1)^{th}$ time instant, and the $(l+2)^{th}$ time instant is constructed by using the spatial adjacency matrix $A^S$ obtained in step S21 and the temporal adjacency matrix $A^T$ obtained in step S22, as shown in a following formula:

$$A^{ST} = \begin{bmatrix} A^S & A^T & 0 \\ A^T & A^S & A^T \\ 0 & A^T & A^S \end{bmatrix} \quad (8)$$

Step S3: Following steps are included.

Step S31: The graph convolutional neural network algorithm is used to perform synchronous spatio-temporal information learning on the transient sample set obtained in step S1, to match with the spatio-temporal adjacency matrix $A^{ST}$ obtained in step S23, the temporal response trajectories of the V, the I, the P, and the Q within the L time instants contained in each sample in the transient sample set obtained in step S1 are divided into L−2 trajectory slices consisting of three consecutive time instants, temporal response trajectories of the V, the I, the P, and the Q within three consecutive time instants in a trajectory slice are comprehensively denoted as x, the x is mapped to hidden layer state $h^0$ by using a fully connected layer, and spatio-temporal graph convolution operation is performed on the $h^0$ by using a graph convolution learning module to obtain $h^1$:

$$h^1 = (A^{ST}h^0W_1 + b_1)e\sigma(A^{ST}h^0W_2 + b_2) \quad (9)$$

In the above formula, $h^1$ represents a hidden layer state obtained by the graph convolution operation, $W_1$, $W_2$, $b_1$, and $b_2$ represent to-be-learned parameters during the graph convolution operation, σ(*) represents a sigmoid activation function, and e represents a matrix dot product.

Figure 2:
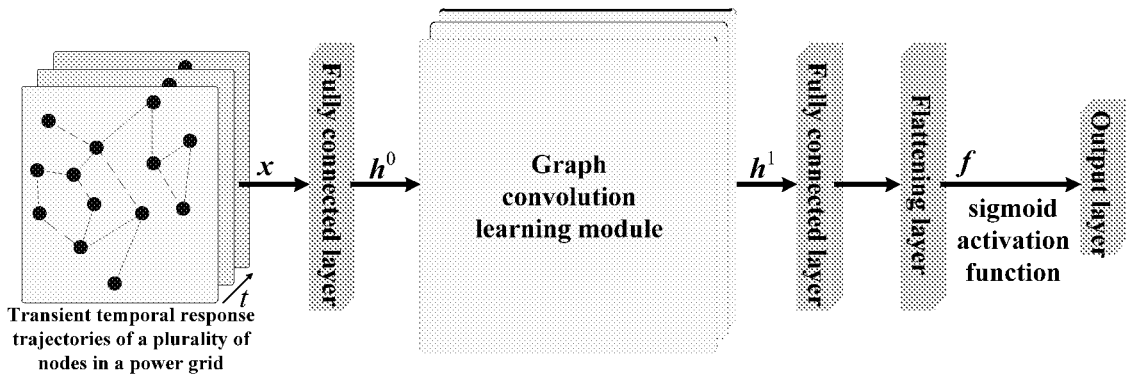
FIG. 2 is a structural diagram of a short-term voltage stability assessment model driven by spatio-temporal information synchronization according to the present disclosure.

The graph convolution operation is performed for L−2 times during graph convolution learning, L−2 trajectory slices are learned separately, the hidden layer state $h^1$ is associated with the fully connected layer and a flattening layer sequentially after the graph convolution learning is completed, an output of the flattening layer is denoted as f, and the output f of the flattening layer is associated with a discretized output of the power grid's predicted status Y' (the transient voltage is stable/unstable) by using the sigmoid activation function, to construct the short-term voltage stability assessment model driven by spatio-temporal information synchronization, as shown in FIG. 2.

It should be noted that in this embodiment, the graph convolutional neural network algorithm is implemented using a Keras toolbox in a Python environment.

Step S32: All transient samples in the transient sample set obtained in step S1 are input in batches into the short-term voltage stability assessment model driven by spatio-temporal information synchronization, to perform training and learning, until the model converges. Next, a cross validation method is used to perform performance test on the short-term voltage stability assessment model driven by spatio-temporal information synchronization; let $N_f$ denote the sum of the number of samples whose actual power grid statuses Y are 1 but their predicted status are mistakenly assessed to be unstable (i.e., Y'=−1), and the number of samples whose actual power grid statuses Y are −1 but their predicted status are mistakenly assessed to be stable (i.e., Y'=−1) in the transient sample set; stability assessment accuracy of the short-term voltage stability assessment model is calculated according to formula Acc=$N_f$/N×100%; and if Acc≥97%, stability assessment performance of the short-term voltage stability assessment model meets a requirement, and the training of the short-term voltage stability assessment model is completed, and then step S4 is performed; if Acc<97%, the synchronous spatio-temporal information learning is performed again by using the transient sample set obtained in step S1 until Acc≥97%, and then step S4 is performed.

Step S4: When the power grid suffers from the transient fault during online operation, the synchronous phasor measurement units deployed at individual monitoring buses in the power grid acquire temporal data of responsive trajectories of V, I, P, and Q within the L time instants in real time after the grid suffers from the transient fault, the obtained temporal data of responsive trajectories of V, I, P, and Q are input into the short-term voltage stability assessment model that passes the performance test in step S32, and the short-term voltage stability assessment model outputs an online assessment result indicating whether the power grid is in the stable status/unstable status after the transient fault. If Y'=1, it is determined that the power grid can maintain a stable transient voltage after suffering from a current transient fault. If Y'=−1, it is determined that the power grid will experience an unstable transient voltage after encountering the current transient fault, and it is necessary to immediately send an early warning message to dispatching platform personnel of the power grid, and take an emergency control measure such as under-voltage load shedding as soon as possible for the current transient accident to restore the stable transient voltage for the power grid as soon as possible.

The above embodiment is a preferred implementation of the present disclosure. In addition, the present disclosure can also be implemented in other ways, and any obvious replacement without departing from the concept of the technical solutions in the present disclosure is within the protection scope of the present disclosure.

In order to facilitate those skilled in the art to better understand improvements of the present disclosure compared to the prior art, some of the accompanying drawings and descriptions of the present disclosure have been simplified, and for the sake of clarity, some other elements have been omitted from the present application document. Those skilled in the art should be aware that these omitted elements can also constitute the content of the present disclosure.

What is claimed is:

1. A method for assessing a short-term voltage stability of a power grid based on a synchronous spatio-temporal information learning, comprising:

step S1: performing a time-domain simulation for each transient fault of the power grid under each operating mode, and extracting a temporal responsive trajectory of each monitoring bus and status information regarding the short-term voltage stability of the power grid from a time-domain simulation process to obtain a transient sample set; wherein an operating mode set and a transient fault set of the power grid are obtained from a dispatching platform of the power grid; N time-domain simulations are performed on each transient fault of the power grid under each operating mode by using an electromechanical transient time-domain simulation method, wherein N=a*b, a represents the number of operating modes, and b represents the number of transient faults; temporal response trajectories of a voltage V, a current I, an active power P, and a reactive power Q within L=50 time instants are recorded for each monitoring bus after the monitoring bus suffers from the transient fault, and a power grid status Y in each time-domain simulation process is recorded, wherein Y=1 represents a transient voltage stability, and Y=−1 represents a transient voltage instability; all temporal response trajectories and power grid statuses recorded in one time-domain simulation process form a transient sample; and all transient samples obtained from the N time-domain simulations are collected to form the transient sample set containing N samples;

step S2: constructing a spatial adjacency matrix and a temporal adjacency matrix separately by using the network impedance matrix of the power grid and correlations between power grid statuses at different time instants, and integrating the spatial adjacency matrix and the temporal adjacency matrix into a spatio-temporal adjacency matrix to comprehensively characterize a spatio-temporal correlation between monitoring buses within different time instants in a transient process of the power grid; wherein step S2 comprises:

step S21: constructing the spatial adjacency matrix $A^S$ for measuring an adjacency degree between the monitoring buses of the power grid, as shown in following formulae:

$$D_{ij} = |(Z_{ii} - Z_{ij}) - (Z_{ji} - Z_{jj})|^2 \quad (1)$$

$$D = [D_{ij}]_{n*n} \quad (2)$$

$$D_{ij}^{norm} = D_{ij} / (\max_{1 \leq u, v \leq n} D_{uv}) \quad (3)$$

$$A_{ij}^S = \frac{1}{1+D_{ij}^{norm}} / \left( \max_{1 \leq u, v \leq n} \frac{1}{1+D_{uv}^{norm}} \right) \quad (4)$$

$$A^S = [A_{ij}^S]_{n*n} \quad (5)$$

wherein Z represents an impedance value between the monitoring buses; i and j represent different monitoring buses, wherein 1≤i, and j≤n; n represents the total number of monitoring buses in the power grid; $D_{ij}$ represents an electrical distance between the monitoring bus i and the monitoring bus j; D represents an electrical distance matrix; $\max_{1 \leq u, v \leq n} D_{uv}$ represents a maximum value of each element in the electrical distance matrix D, wherein u and v represent different monitoring buses, 1≤u, and v≤n; $D_{ij}^{norm}$ represents a normalized electrical distance between the monitoring bus i and the monitoring bus j; $D_{uv}^{norm}$ represents a normalized electrical distance between the monitoring bus u and the monitoring bus v; and $A_{ij}^S$ represents a metric of a spatial adjacency degree between the monitoring bus i and the monitoring bus j;

step S22: constructing the temporal adjacency matrix $A^T$ representing a temporal correlation between the monitoring buses within two consecutive time instants after the power grid suffers from the transient fault, as shown in following formulae:

$$A_{ij}^T = \begin{cases} 1, & i = j \\ 0, & i \neq j \end{cases} \quad (6)$$

$$A^T = [A_{ij}^T]_{n*n} \quad (7)$$

wherein $A_{ij}^T$ represents a metric of a temporal adjacency degree between the monitoring bus i and the monitoring bus j; and step S23: constructing the spatio-temporal adjacency matrix $A^{ST}$ representing a spatio-temporal correlation between the monitoring buses within three consecutive time instants after the power grid suffers from the transient fault, as shown in a following formula:

$$A^{ST} = \begin{bmatrix} A^S & A^T & 0 \\ A^T & A^S & A^T \\ 0 & A^T & A^S \end{bmatrix}; \quad (8)$$

step S3: performing the synchronous spatio-temporal information learning on the transient sample set by using a graph convolutional neural network algorithm, and performing a training to obtain a short-term voltage stability assessment model driven by a spatio-temporal information synchronization; and step S4: when the power grid suffers from the transient fault during an online operation, obtaining a transient temporal responsive trajectory of each monitoring bus in real time, inputting the transient temporal responsive trajectory into the short-term voltage stability assessment model, and outputting, by the short-term voltage stability assessment model, an online assessment result of the short-term voltage stability of the power grid in real time; and taking an emergency control measure to restore the stable transient voltage for the power grid.

2. The method for assessing the short-term voltage stability of the power grid based on the synchronous spatio-temporal information learning according to claim 1, wherein step S3 comprises:

step S31: performing, by using the graph convolutional neural network algorithm, the synchronous spatio-temporal information learning on the transient sample set obtained in step S1, to match with the spatio-temporal adjacency matrix $A^{ST}$ obtained in step S23, dividing the temporal response trajectories of the voltage V, the current I, the active power P, and the reactive power Q within L time instants contained in each sample in the transient sample set obtained in step S1 into L−2 trajectory slices consisting of three consecutive time instants, concisely denoting the temporal response trajectories of the voltage V, the current I, the active power P, and the reactive power Q within the three consecutive time instants in a trajectory slice as x, mapping the x to a hidden layer state $h^0$ using a fully connected layer, and performing a spatio-temporal graph convolution operation on the hidden layer state $h^0$ by using a graph convolution learning module to obtain $h^1$:

$$h^1 = (A^{ST} h^0 W_1 + b_1) e \sigma (A^{ST} h^0 W_2 + b_2) \quad (9)$$

wherein $h^1$ represents a hidden layer state obtained by the spatio-temporal graph convolution operation, $W_1$, $W_2$, $b_1$, and $b_2$ represent to-be-learned parameters during the spatio-temporal graph convolution operation, $\sigma(*)$ represents a sigmoid activation function, and e represents a matrix dot product; and performing the spatio-temporal graph convolution operation for L−2 times during a graph convolution learning, learning L−2 trajectory slices separately, associating the hidden layer state $h^1$ with the fully connected layer and a flattening layer sequentially after completing the graph convolution learning, denoting an output of the flattening layer as f, and associating the output f of the flattening layer with a discretized output of the power grid's predicted status Y' by using the sigmoid activation function, to construct the short-term voltage stability assessment model driven by the spatio-temporal information synchronization; and step S32: implementing, by using the transient sample set obtained in step S1, synchronous spatio-temporal information learning and performance test on the short-term voltage stability assessment model driven by spatio-temporal information synchronization in step S31, until a stability assessment accuracy of the short-term voltage stability assessment model meets a requirement.

3. The method for assessing the short-term voltage stability of the power grid based on the synchronous spatio-temporal information learning according to claim 2, wherein in step S32, the performance test is performed on the short-term voltage stability assessment model by using a cross validation method; let $N_f$ denote a sum the number of samples whose actual power grid statuses Y are 1 but predicted statuses are mistakenly assessed to be unstable (i.e., Y'=−1) and the number of samples whose actual power grid statuses Y are −1 but predicted statuses are mistakenly assessed to be stable (i.e., Y'=−1) in the transient sample set; the stability assessment accuracy of the short-term voltage stability assessment model is calculated according to a formula $Acc=N_f/N \times 100\%$; and if $Acc \geq 97\%$, stability assessment performance of the short-term voltage stability assessment model meets the requirement, and the synchronous spatio-temporal information learning training of the short-term voltage stability assessment model is completed, and then step S4 is performed; if Acc<97%, the synchronous spatio-temporal information learning is performed again by using the transient sample set obtained in step S1 until $Acc \geq 97\%$, and then step S4 is performed.

4. The method for assessing the short-term voltage stability of the power grid based on the synchronous spatio-temporal information learning according to claim 3, wherein in step S4, when the power grid suffers from the transient fault during the online operation, synchronous phasor measurement units deployed at individual monitoring buses in the power grid acquire the temporal data of responsive trajectories of the voltage V, the current I, the active power P, and the reactive power Q within the L time instants in real time after the power grid suffers from the transient fault, the temporal data of responsive trajectories of the voltage V, the current I, the active power P, and the reactive power Q are input into the short-term voltage stability assessment model that passes the performance test in step S32, and the short-term voltage stability assessment model outputs the online assessment result indicating whether the power grid is in a stable status or an unstable status.

\* \* \* \* \*